United States Patent
Anneton et al.

(10) Patent No.: US 12,528,124 B2
(45) Date of Patent: Jan. 20, 2026

(54) REMOVABLE IMAGE-CAPTURE APPARATUS, KIT AND METHOD FOR CALIBRATING AN ADDITIVE MANUFACTURING APPARATUS

(71) Applicant: AddUp, Cebazat (FR)

(72) Inventors: Antoine Anneton, Cebazat (FR); Raphael Vernet, Cebazat (FR); Olivier Lauwers, Cebazat (FR); Ahmed-Amine Homman, Cebazat (FR)

(73) Assignee: ADDUP, Cebazat (FR)

( * ) Notice: Subject to any disclaimer, the term of this patent is extended or adjusted under 35 U.S.C. 154(b) by 496 days.

(21) Appl. No.: 18/009,497

(22) PCT Filed: Jun. 7, 2021

(86) PCT No.: PCT/FR2021/051019
§ 371 (c)(1),
(2) Date: Dec. 9, 2022

(87) PCT Pub. No.: WO2021/250346
PCT Pub. Date: Dec. 16, 2021

(65) Prior Publication Data
US 2023/0234134 A1    Jul. 27, 2023

(30) Foreign Application Priority Data

Jun. 11, 2020 (FR) .................................... 2006111

(51) Int. Cl.
*B33Y 50/02* (2015.01)
*B22F 10/31* (2021.01)
(Continued)

(52) U.S. Cl.
CPC ............ *B22F 10/31* (2021.01); *B22F 10/366* (2021.01); *B22F 10/85* (2021.01); *B22F 12/30* (2021.01);
(Continued)

(58) Field of Classification Search
CPC ..................................................... B33Y 50/02
See application file for complete search history.

(56) References Cited

U.S. PATENT DOCUMENTS 6,483,596 B1   11/2002 Philippi et al.
11,458,680 B2  10/2022 Roblin et al.
(Continued)

FOREIGN PATENT DOCUMENTS

CN   110625936 A  * 12/2019  ............. B29C 64/20
EP   1048441 A1    11/2000
(Continued)

OTHER PUBLICATIONS

International Search Report dated Jul. 20, 2021, in corresponding PCT/FR2021/05019 (6 pages).
(Continued)

*Primary Examiner* — Suresh Suryawanshi
(74) *Attorney, Agent, or Firm* — VENABLE LLP

(57) ABSTRACT

A removable image-capture apparatus (200) comprises an opening (202) intended to receive a calibration plate (10) bearing a reference marking (30) and possibly a test marking (40). The apparatus (200) comprises a source (204) of backlighting visible light situated beneath the opening (202), a sensor (205) for acquiring an image, in the backlighting visible light, of the plate (10), a guiding and supporting device (206) for positioning the sensor (205) above the opening (202) relative to the surround (201), a calculation device (207) configured to analyze the image, recognize the marking (30) and possibly the marking (40) in the image, and calculate aiming-command corrections intended for a firing system firing a powerful incident-radiation beam, which system belongs to an additive manufacturing apparatus, distinct and separate from the apparatus (200).

19 Claims, 7 Drawing Sheets

(51) Int. Cl.
*B22F 10/366* (2021.01)
*B22F 10/85* (2021.01)
*B22F 12/30* (2021.01)
*B22F 12/90* (2021.01)
*B22F 10/28* (2021.01)
*B33Y 30/00* (2015.01)
*B33Y 40/00* (2020.01)

(52) U.S. Cl.
CPC .............. *B22F 12/90* (2021.01); *B22F 10/28* (2021.01); *B33Y 30/00* (2014.12); *B33Y 40/00* (2014.12); *B33Y 50/02* (2014.12)

(56) References Cited

U.S. PATENT DOCUMENTS

| | | |
|---|---|---|
| 11,554,551 B2 | 1/2023 | Roblin et al. |
| 2003/0192868 A1 | 10/2003 | Dietrich et al. |
| 2010/0176539 A1 | 7/2010 | Higashi et al. |
| 2010/0264302 A1 | 10/2010 | Phillipi |
| 2015/0100149 A1 | 4/2015 | Coeck et al. |
| 2016/0082668 A1 | 3/2016 | Perret et al. |
| 2017/0274592 A1 | 9/2017 | Herzog et al. |
| 2018/0078411 A1 | 3/2018 | Fuchs et al. |
| 2018/0347969 A1* | 12/2018 | Snelling, Jr. ......... G01B 11/002 |
| 2019/0047228 A1* | 2/2019 | Brown ............... G05B 19/4015 |
| 2020/0122404 A1 | 4/2020 | Roblin et al. |
| 2020/0215759 A1* | 7/2020 | Roblin .................. B33Y 50/00 |
| 2020/0276764 A1* | 9/2020 | Mccarthy ............. B23K 26/042 |
| 2021/0323087 A1* | 10/2021 | Lehmann ............... B29C 64/393 |
| 2023/0234133 A1 | 7/2023 | Anneton et al. |

FOREIGN PATENT DOCUMENTS

| | | | |
|---|---|---|---|
| EP | 3650206 A1 | 5/2020 | |
| FR | 3067623 A1 * | 12/2018 | ............. B22F 10/00 |
| WO | 2018/234312 A1 | 12/2018 | |
| WO | 2018/234336 A1 | 12/2018 | |

OTHER PUBLICATIONS

R. Halme, et al., "Enhancing laser scanner accuracy by grid correction", Proc. SPIE 7590, Micromachining and Microfabrication Process Technology SV, 759007 (Feb. 16, 2010); doi: 10.1117/12.841741, pp. 759007-1-759007-9 (XP055762543).

* cited by examiner

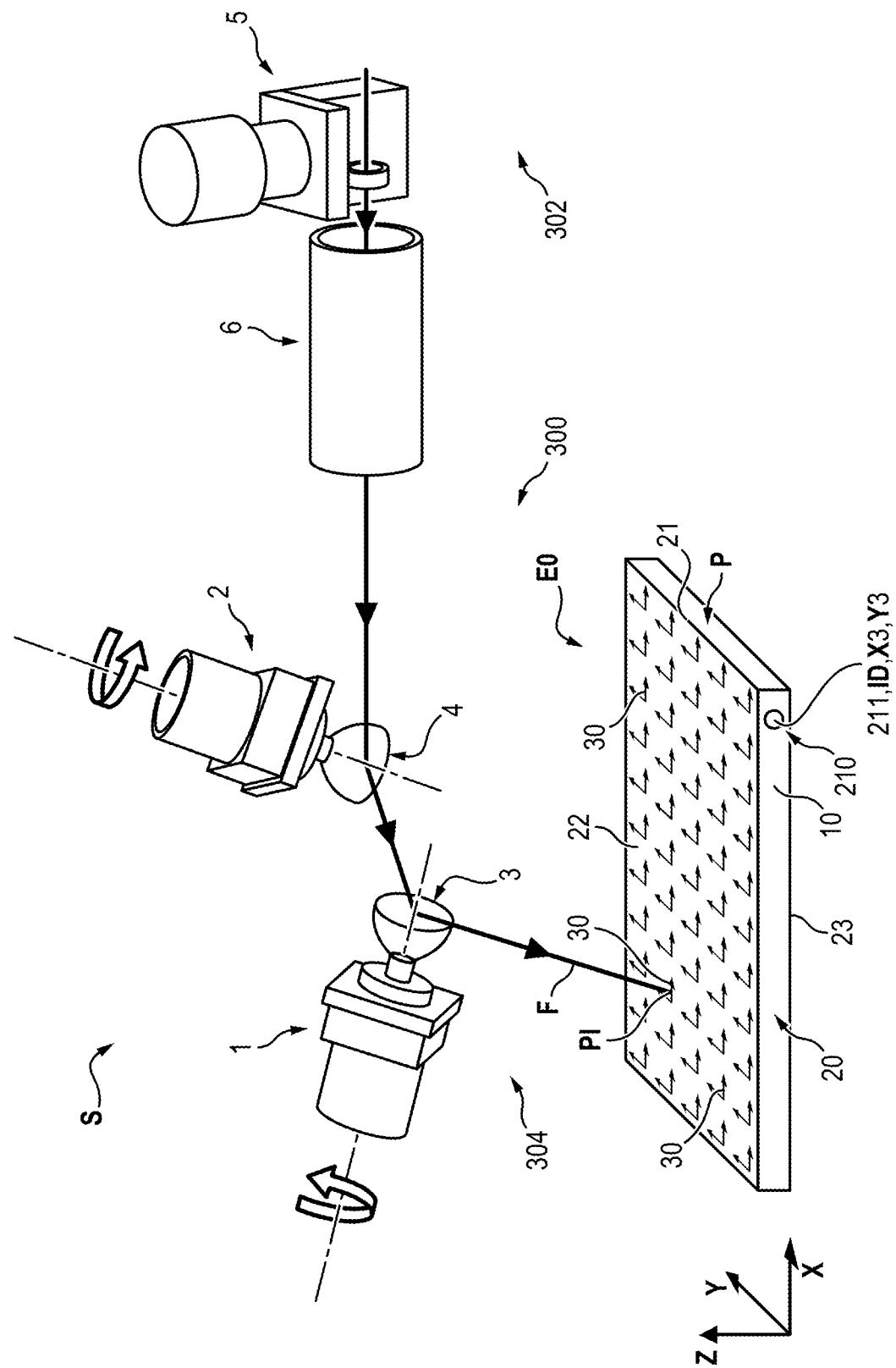

REMOVABLE IMAGE-CAPTURE APPARATUS, KIT AND METHOD FOR CALIBRATING AN ADDITIVE MANUFACTURING APPARATUS

BACKGROUND

The invention relates to an image-capture apparatus for capturing at least one image, a calibration kit, and a calibration method for calibrating a firing system of a selective-printing or an additive manufacturing apparatus.

Document WO 2018/234312 describes a calibration plate which bears reference markings and which is formed of a sheet of glass on which there may be positioned a support formed by a strip of a material sensitive to the beam of laser radiation, this support having windows centred on the reference markings. A laser-beam firing system of an additive manufacturing apparatus is able to fire onto the support a calibration pattern made up of several points of impact around the reference markings. Control equipment comprising a camera, an optical system and a diode-based illumination system is installed on the additive manufacturing apparatus and is moved, on a support involving rails, in two horizontal directions over the plate and over the support in order to acquire an image of the calibration pattern and of the reference marking. A firing-system command is corrected on the basis of the image obtained.

One disadvantage with the device described in that document WO 2018/234312 is that the image acquisition needs to be performed in the additive manufacturing apparatus. Thus, the user is entirely dependent on the additive manufacturing apparatus for acquiring the image.

The RONI-JUSSI K+HALME ET AL. document: "Enhancing laser scanner accuracy by grid correction" (Proceedings of SPIE, 10 Feb. 2010) effectively provides a method for calibrating a laser scanner.

In addition, efforts are being made to improve the illumination of the images acquired by the image-capture sensor.

Efforts are also being made to overcome the disadvantage of having to use only the plate provided in the additive manufacturing apparatus.

SUMMARY

A first objective of the invention is to obtain an image-capture apparatus for capturing at least one image, a calibration kit, and a calibration method for calibrating a firing system of a selective-printing or an additive manufacturing apparatus, which overcome the above-mentioned disadvantages.

A second objective of the invention is to obtain an image-capture apparatus for capturing at least one image, a calibration kit, and a calibration method for calibrating a firing system of a selective-printing or an additive manufacturing apparatus, which are able to improve the illumination of the images produced by the image-capture sensor.

To this end, one first subject of the invention is a removable image-capture apparatus for capturing at least one image, the image-capture apparatus comprising:
a casing comprising a surround delimiting an opening intended to receive a calibration plate bearing at least one reference marking and possibly at least one test marking,
retaining members for holding the calibration plate in the opening, characterized in that the image-capture apparatus further comprises:
at least one source of backlighting visible light situated beneath the opening,
a sensor for acquiring at least one image, in the backlighting visible light, of the calibration plate,
a guiding and supporting device for positioning the sensor above the opening relative to the surround,
a calculation device configured to analyse the at least one image acquired by the sensor, recognise the at least one reference marking and the possible at least one test marking in the at least one image acquired by the sensor, and calculate aiming-command corrections intended for a firing system firing at least one powerful incident-radiation beam, which system belongs to an additive manufacturing apparatus, distinct and separate from the image-capture apparatus,
the image-capture apparatus and/or the calculation device comprising a first memory in which there have been pre-recorded, in association with a determined unique identification of the calibration plate, absolute coordinates of the at least one reference marking, which coordinates have been determined beforehand,
the calculation device being configured to calculate the aiming-command corrections for the aiming of the firing system firing the at least one powerful incident-radiation beam, which system belongs to the additive manufacturing apparatus, on the basis of coordinates of the at least one test marking, that were calculated for the at least one reference marking, and on the basis of the absolute coordinates of the at least one reference marking.

By virtue of the invention, use may be made of a calibration plate that is situated outside of the additive manufacturing apparatus, the reference markings associated with this plate being recognised together with the identification of the plate in the image-capture apparatus.

By virtue of the invention, the image-capture apparatus that captures at least one image is separated from the additive manufacturing apparatus so that the calibration plate can be backlit, making it possible to obtain a better image of the test markings produced by firing the powerful incident-radiation beam than can be achieved by the control equipment according to document WO 2018/234312, which is illuminated from above. The image-capture apparatus that captures at least one image directly provides the aiming-command corrections that need to be made to the firing system firing the at least one powerful incident-radiation beam F, which system belongs to the additive manufacturing apparatus. The image-capturing apparatus that captures at least one image can thus be transported to a work location to take and analyse images of the markings of one or more calibration plates and supply the aiming-command corrections corresponding to these markings.

A second subject of the invention is a portable calibration kit, comprising the image-capture apparatus for capturing at least one image as described above and at least a removable calibration plate, the removable calibration plate being able to be positioned in the field of a firing system firing at least one powerful incident-radiation beam, which system belongs to an additive manufacturing apparatus,
the removable calibration plate comprising a sheet,
the sheet comprising an upper face intended to face towards the powerful incident-radiation beam, the sheet bearing the at least one reference marking and being intended to receive at least one test marking, and a lower face, which is distanced from the upper face in the thickness direction of the sheet, the removable calibration plate comprises at least one etching layer to be etched by a powerful incident-radiation beam, the at least one etching layer to be etched by a powerful incident-radiation beam being secured to the upper face of the sheet and being opaque to visible light, the at least one etching layer to be etched by a powerful incident-radiation beam being able to be destroyed locally by the powerful incident-radiation beam in order to optionally form the at least one test marking, the sheet being transparent to visible light, the lower face of the sheet being frosted.

According to one embodiment of the invention, the lower face of the sheet allows backlighting visible light to pass from the lower face of the sheet through the sheet, the at least one reference marking and optionally the at least one test marking.

According to one embodiment of the invention, the at least one reference marking is created by locally destroying the at least one etching layer using the powerful incident-radiation beam.

According to one embodiment of the invention, in the at least one etching layer to be etched by a powerful incident-radiation beam there is at least one positioning sighting mark of dimensions greater than the dimensions of the at least one reference marking and/or than the dimensions of the at least one test marking.

According to one embodiment of the invention, absolute coordinates of the at least one reference marking, which coordinates have been determined beforehand, are associated with the calibration plate.

According to one embodiment of the invention, the at least one etching layer to be etched by a powerful incident-radiation beam is at least one etching layer to be etched by a powerful beam of incident laser radiation.

According to one embodiment of the invention, the sheet contains glass or is made of glass.

According to one embodiment of the invention, the calibration plate comprises the at least one test marking created by locally destroying the at least one etching layer using the powerful incident-radiation beam.

According to one embodiment of the invention, in the at least one etching layer to be etched by a powerful incident-radiation beam there are the at least one reference marking created by locally destroying the at least one etching layer to be etched by a powerful incident-radiation beam and the at least one test marking created by locally destroying the at least one etching layer to be etched by a powerful incident-radiation beam.

According to one embodiment of the invention, the at least one test marking present in the etching layer to be etched by a powerful incident-radiation beam comprises an identification of the test marking.

According to one embodiment of the invention, the kit further comprises a removable storage medium, distinct from the first memory and on which are stored the determined unique identification of the calibration plate and the absolute coordinates of the at least one reference marking, which coordinates are associated with the determined unique identification of the calibration plate, the image-capture apparatus and/or the calculation device comprising an interface allowing the determined unique identification of the calibration plate and/or the absolute coordinates of the at least one reference marking, which coordinates are associated with the determined unique identification of the calibration plate, to be recovered from the removable storage medium in order to record them in the first memory.

According to one embodiment of the invention, the removable calibration plate comprises at least one second non-volatile memory, in which there are recorded the unique identification of the calibration plate and the absolute coordinates of the at least one reference marking, which coordinates are associated with the unique identification of the calibration plate, the at least one second non-volatile memory of the removable calibration plate is in the form of an NFC and/or RFID chip fixed to the removable calibration plate, the image-capture apparatus and/or the calculation device and/or the sensor comprises an NFC and/or RFID reader able to read from the NFC and/or RFID chip the unique identification of the calibration plate and/or the absolute coordinates of the at least one reference marking, in order to record them in the first memory.

A third subject of the invention is a method for calibrating a firing system firing at least one powerful incident-radiation beam, which system belongs to an additive manufacturing apparatus, using the removable calibration kit as described hereinabove, characterized in that the calibration method comprises the following steps:

positioning the removable calibration plate in the additive manufacturing apparatus, the at least one etching layer to be etched by a powerful incident-radiation beam, and belonging to the removable calibration plate, being oriented towards that side of the additive manufacturing apparatus from which the firing system emits the at least one powerful incident-radiation beam, commanding the firing system firing the at least one powerful incident-radiation beam, which system belongs to the additive manufacturing apparatus, according to an aiming command for the aiming of the firing system, which is determined with respect to the at least one reference marking, to emit the at least one powerful incident-radiation beam from the emission side onto the at least one etching layer of the removable calibration plate in order thereon to form the at least one test marking by local destruction of the etching layer, extracting the removable calibration plate from the additive manufacturing apparatus, moving the removable calibration plate to the image-capture apparatus for capturing at least one image, which apparatus is portable and separated from the firing system firing the at least one powerful incident-radiation beam, which system belongs to the additive manufacturing apparatus, positioning the removable calibration plate in the opening of the image-capture apparatus, commanding the at least one source of backlighting visible light of the image-capture apparatus so that the backlighting visible light passes through the opening, from the lower face, the sheet, the at least one reference marking and the at least one test marking, acquiring, using the sensor, at least one image of a zone in which there are the at least one reference marking and the at least one test marking produced with backlighting visible light, analysing, using a calculation device belonging to the image-capture apparatus, the at least one image acquired by the sensor and recognising the at least one reference marking and the at least one test marking in the at least one image acquired, so as to calculate coordinates of the at least one test marking with respect to the at least one reference marking, calculating and recording, in the first memory of the image-capture apparatus, using the calculation device of the image-capture apparatus, aiming-command corrections for the aiming of the firing system firing the at least one powerful incident-radiation beam, which system belongs to the additive manufacturing apparatus, on the basis of at least the coordinates of the at least one test marking, that were calculated for the at least one reference marking.

According to one embodiment of the invention, pre-recorded in the first memory are absolute coordinates of the at least one reference marking, having been determined beforehand, the calculation device being configured to calculate the aiming-command corrections for the aiming of the firing system firing the at least one powerful incident-radiation beam, which system belongs to the additive manufacturing apparatus, on the basis of the coordinates of the at least one test marking that have been calculated for the at least one reference marking and on the basis of the absolute coordinates of the at least one reference marking.

According to one embodiment of the invention, pre-recorded in the first memory are absolute coordinates of the at least one reference marking, having been determined beforehand, the calculation device being configured to calculate the aiming-command corrections for the aiming of the firing system firing the at least one powerful incident-radiation beam, which system belongs to the additive manufacturing apparatus, on the basis of the coordinates of the at least one test marking that have been calculated for the at least one reference marking and on the basis of the absolute coordinates of the at least one reference marking.

According to one embodiment of the invention, the aiming-command corrections are recorded in the first memory in association with the identification of the removable calibration plate and with the absolute coordinates of the at least one reference marking.

According to one embodiment of the invention, the aiming-command corrections are recorded in the firing system firing the at least one powerful incident-radiation beam and belonging to the additive manufacturing apparatus.

According to one embodiment of the invention, in the at least one etching layer to be etched by a powerful incident-radiation beam there is at least one positioning sighting mark having dimensions greater than the dimensions of the at least one reference marking and/or than the dimensions of the at least one test marking, the following steps are performed between the positioning of the removable calibration plate in the additive manufacturing apparatus and the commanding of the firing system firing the at least one powerful incident-radiation beam, which system belongs to the additive manufacturing apparatus:

commanding the at least one firing system belonging to the additive manufacturing apparatus to emit at least one other beam of visible-light radiation, without emitting a powerful incident-radiation beam from the emission side onto the at least one etching layer of the removable calibration plate so as to plan for a first impact of the at least one other beam of visible-light radiation on the at least one positioning sighting mark, measuring, with the naked eye, on the at least one positioning sighting mark, the offset in the centring of the first impact of the other beam of visible-light radiation with respect to a theoretical position that is supposed to be at the centre of the at least one positioning sighting mark, modifying the command of the at least one firing system belonging to the additive manufacturing apparatus with a command-offset correction so that it emits at least one other beam of visible-light radiation, without emitting a powerful incident-radiation beam from the emission side onto the at least one etching layer of the removable calibration plate so as to plan for a second impact of the at least one other beam of visible-light radiation on the centre of the at least one positioning sighting mark, recording the command-offset correction in a memory of the firing system or of the additive manufacturing apparatus and/or in another memory of the image-capture apparatus and/or in a memory of the calculation device, said commanding of the at least one firing system firing the at least one powerful incident-radiation beam, which system belongs to the additive manufacturing apparatus, according to the aiming command for the aiming of the firing system, which is determined with respect to the at least one reference marking, to emit the at least one powerful incident-radiation beam from the emission side onto the at least one etching layer of the removable calibration plate in order thereon to form the at least one test marking by local destruction of the etching layer, being performed with the recorded command-offset correction applied, the at least one powerful incident-radiation beam and the at least one other visible-light laser beam being coaxial.

According to one embodiment of the invention, the kit further comprises a removable storage medium, distinct from the first memory and on which are stored the determined unique identification of the calibration plate and the absolute coordinates of the at least one reference marking, which coordinates are associated with the determined unique identification of the calibration plate, the image-capture apparatus and/or the calculation device comprising an interface allowing the determined unique identification of the calibration plate and/or the absolute coordinates of the at least one reference marking, which coordinates are associated with the determined unique identification of the calibration plate, to be recovered from the removable storage medium in order to record them in the first memory, and the method further comprises, between the positioning of the removable calibration plate in the additive manufacturing apparatus and the commanding of the firing system firing the at least one powerful incident-radiation beam, which system belongs to the additive manufacturing apparatus, according to the aiming command for the aiming of the firing system, the intermediate step of reading the unique identification of the calibration plate and/or the absolute coordinates of the at least one reference marking from the removable storage medium.

According to one embodiment of the invention, the removable calibration plate comprises at least one second non-volatile memory in which there are recorded a unique identification of the calibration plate and absolute coordinates of the at least one reference marking, which coordinates have been determined beforehand and are associated with the unique identification of the calibration plate, the at least one second non-volatile memory is in the form of an NFC and/or RFID chip fixed to the removable calibration plate, the image-capture apparatus and/or the calculation device and/or the sensor comprises an NFC and/or RFID reader able to read from the NFC and/or RFID chip the unique identification of the calibration plate and/or the absolute coordinates of the at least one reference marking, the method further comprises, between the positioning of the removable calibration plate in the additive manufacturing apparatus and the commanding of the firing system firing the at least one powerful incident-radiation beam, which system belongs to the additive manufacturing apparatus, according to the aiming command for the aiming of the firing system, the intermediate step of reading the unique identification of the calibration plate and/or the absolute coordinates of the at least one reference marking in the NFC and/or RFID chip using the NFC and/or RFID reader.

According to one embodiment of the invention, the method further comprises, between the positioning of the removable calibration plate in the additive manufacturing apparatus and the commanding of the firing system firing the at least one powerful incident-radiation beam, which system belongs to the additive manufacturing apparatus, according to the aiming command for the aiming of the firing system, the intermediate step of reading the unique identification of the calibration plate and/or the absolute coordinates of the at least one reference marking from a file stored in a database hosted on a remote server to which the calculation device has access.

BRIEF DESCRIPTION OF THE FIGURES

The invention will be understood better from reading the following description, which is given solely by way of non-limiting example and with reference to the below figures of the attached drawings.

FIG. 1 depicts a schematic perspective view of the optical chain of a three-axis head of a laser-beam firing system belonging to an additive manufacturing apparatus, that can use the calibration plate, the calibration kit and the calibration method according to one embodiment of the invention.

DETAILED DESCRIPTION

One exemplary embodiment of a removable calibration plate 10 which can be used according to the invention is described in further detail hereinbelow with reference to FIGS. 4 to 7.

Figure 3:
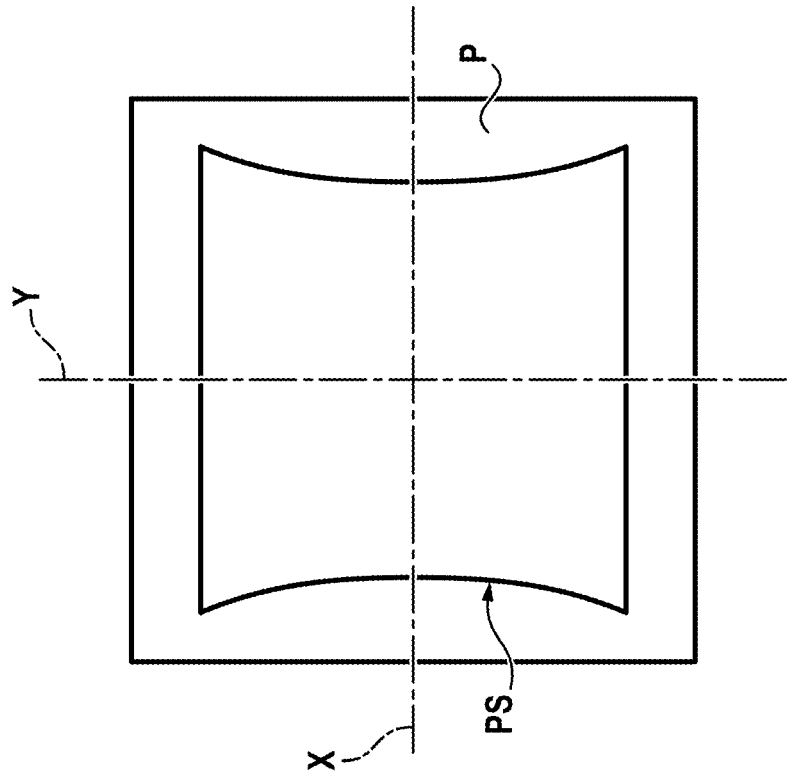
FIG. 3 depicts a schematic view, from above, of the scanning that can be performed by the laser beam of the firing system belonging to an additive manufacturing apparatus, that can use the calibration plate, the calibration kit and the calibration method according to one embodiment of the invention, to illustrate the deformation obtained in the absence of correction.
Figure 2:
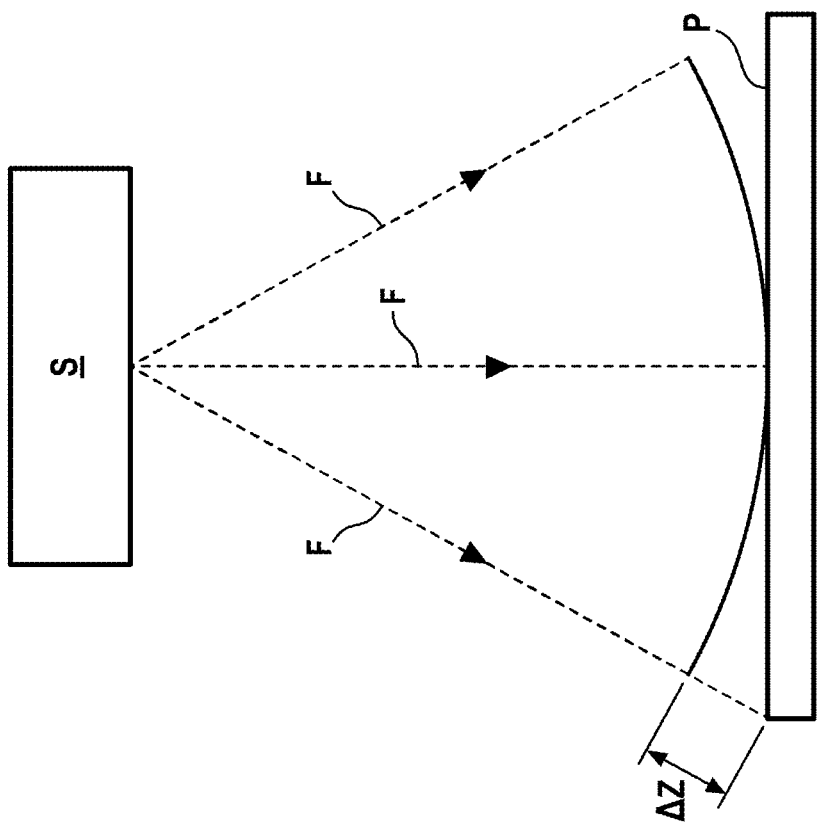
FIG. 2 depicts a schematic face-on view of the scanning that can be performed by the laser beam of the firing system belonging to an additive manufacturing apparatus, that can use the calibration plate, the calibration kit and the calibration method according to one embodiment of the invention, to illustrate the deformation obtained in the absence of correction.
Figure 4:
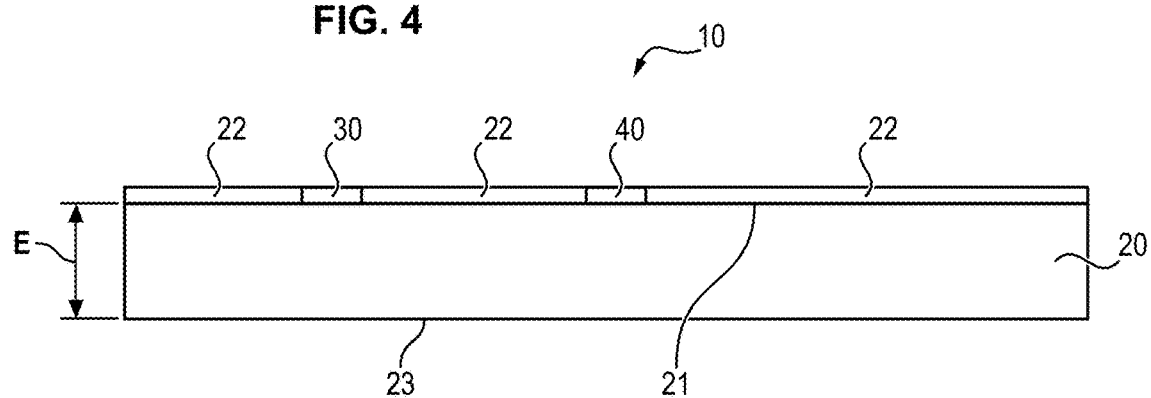
FIG. 4 depicts a schematic view in cross section of a calibration plate according to one embodiment of the invention.

The removable calibration plate 10 is able to be positioned in a firing system 300 firing the at least one powerful incident-radiation beam F, which system belongs to a selective-printing or an additive manufacturing apparatus 302, illustrated in FIGS. 1 to 3. The powerful incident-radiation beam F may be a powerful beam F of incident optical radiation or a powerful beam F of incident laser radiation. Of course, everything described hereinbelow with reference to the laser beam F is as valid for a powerful beam F of incident optical radiation as it is for a powerful beam F of incident laser radiation. The powerful incident-radiation beam F is focused.

Selective additive manufacturing consists in creating three-dimensional objects by consolidating selected zones in successive layers of powdered material (metallic powder, ceramic powder). The consolidated zones correspond to successive cross sections of the three-dimensional object. Consolidation is performed, layer by layer, by total or partial selective melting performed with a focused source of radiation, such as an optical source (high-power laser for example) or else a particle beam source (for example a beam of electrons in the technology known as EBM or "Electron Beam Melting" according to the terminology of the art).

In what follows, reference will be made chiefly to optical sources (such as used in SLM, or "Selective Laser Melting" according to the terminology of the art), such as, for example, powerful laser beam sources. However, it can be applied using any other type of radiation.

As illustrated in FIGS. 1 to 3, additive manufacturing apparatuses 302 of the type using an optical source use a firing system 300 that fires one or more powerful incident laser beams F and use three-axis head systems S with three galvanometers in order to provide increased precision on the one hand regarding the position of the point of impact on the layer of powdered material and, on the other hand, regarding the focusing of the beam F on said layer.

Two galvanometers 1, 2 are used to guide the rotation of two mirrors 3, 4 and make it possible to control the path of the beam F leaving the head S, so as to control the position of the point of impact of the beam on the powder bed (working plane P) (control in X and in Y). Furthermore, a DFM ("Dynamic Focusing Module" according to the terminology of the art)—comprising a galvanometer, a translation module and a lens—makes it possible, by adapting the translational movement of said lens, to perfectly adjust the focal point of the beam F onto the powder bed (control in Z). FIG. 1 also depicts an objective-lens module 6 which introduces a fixed focus, the DFM module 5 making it possible to modify the focusing upstream.

Indeed it will be appreciated that the better the laser beam F is focused on the powder bed, the greater the amount of and control over the energy transmitted to the melt point.

Nevertheless, it will be noted that such a three-axis head system S implies two main types of deformation at the powder bed (plane P).

First of all, the focusing on the working plane P at which the powder bed is situated varies according to the inclination of the optical beam F. As indeed illustrated in FIG. 2, the inclination of the beam F is the result of variations in the optical path length (which variations are indicated schematically by $\Delta Z$ in FIG. 2), these variations themselves having to be added to the phenomena caused by the play induced by the mirrors or else by passing through the various windows there might be in the additive manufacturing apparatus 302.

In the absence of any processing of this geometric offset, the focus across the entirety of the working plane P is therefore not constant.

Furthermore, a non-linear deformation in X and in Y of the patterns of the points of impact (deformation said to be "pillow-shaped" according to the terminology of the art generally used—shape PS in FIG. 3) is conventionally seen on the working plane P. This deformation is caused by the geometry of the optical path, notably by the position of the mirrors and optics and by their distance from the plate P.

It is conventionally known practice to correct the commands for the heads in order to account for the distortions in X and in Y.

In order to do this, use is made of previously determined dedicated correction tables.

These tables give command differentials via which the command inputs for the three-axis head S are corrected. Firings and sweeps of the working plane P by the optical beam F are thus performed with positions in X and in Y that are corrected with respect to the powder bed.

In order to determine these correction tables, use is made of calibration plates 10 which bear reference markings 30. Sequences of optical firings F are performed at predetermined target positions on the plate 10 in order to create test markings 40. The image-capture apparatus 200 identifies the position of these test markings 40 in relation to the reference markings 30.

The differentials between the positions of the test markings 40 thus made on the calibration plate 10 and the theoretically targeted positions of the firings are used to calculate the corrections COR that need to be applied to the commands in X and in Y of the optical beam head system S.

The removable calibration plate 10 comprises a transparent sheet 20 having an upper face 21 intended to face towards the incident beam F. The sheet 20 may contain glass or be made of glass. Everything described hereinbelow in respect of the sheet 20 made of glass is a valid for any sheet 20 that is transparent to visible light. The upper face 21 of the glass sheet 20 is secured to at least one etching layer 22 to be etched by the incident beam F. The etching layer 22 is intended to face towards the incident beam F when the calibration plate 10 is placed in the additive manufacturing apparatus 302. The etching layer 22 is opaque to visible light. Beneath the etching layer 22, the glass sheet 20 is transparent to visible light.

The etching layer 22 is able to be destroyed locally by the powerful incident-radiation beam F from the firing system 300 belonging to the additive manufacturing apparatus 302, in which case the etching layer 22 is referred to as the etching layer 22 to be etched by a powerful incident-radiation beam F, or by the powerful beam F of incident laser radiation from the firing system 300 belonging to the additive manufacturing apparatus 302, in which case the etching layer 22 is referred to as the laser-etching layer 22, or by the powerful beam F of incident optical radiation from the firing system 300 belonging to the additive manufacturing apparatus 302, in which case the etching layer 22 is referred to as the optical-etching layer 22, so as to form one or more reference markings 30 and/or one or more test markings 40 in this etching layer 22. The marking or markings 30 and/or 40 are therefore visible by transparency in the laser-etching layer 22 and are surrounded by parts of the layer 22 which have remained opaque (have not been destroyed). Everything described hereinbelow in respect of the laser-etching layer 22 is also valid in respect of an etching layer 22 to be etched by a powerful incident-radiation beam F and of an optical-etching layer 22.

Figure 5:
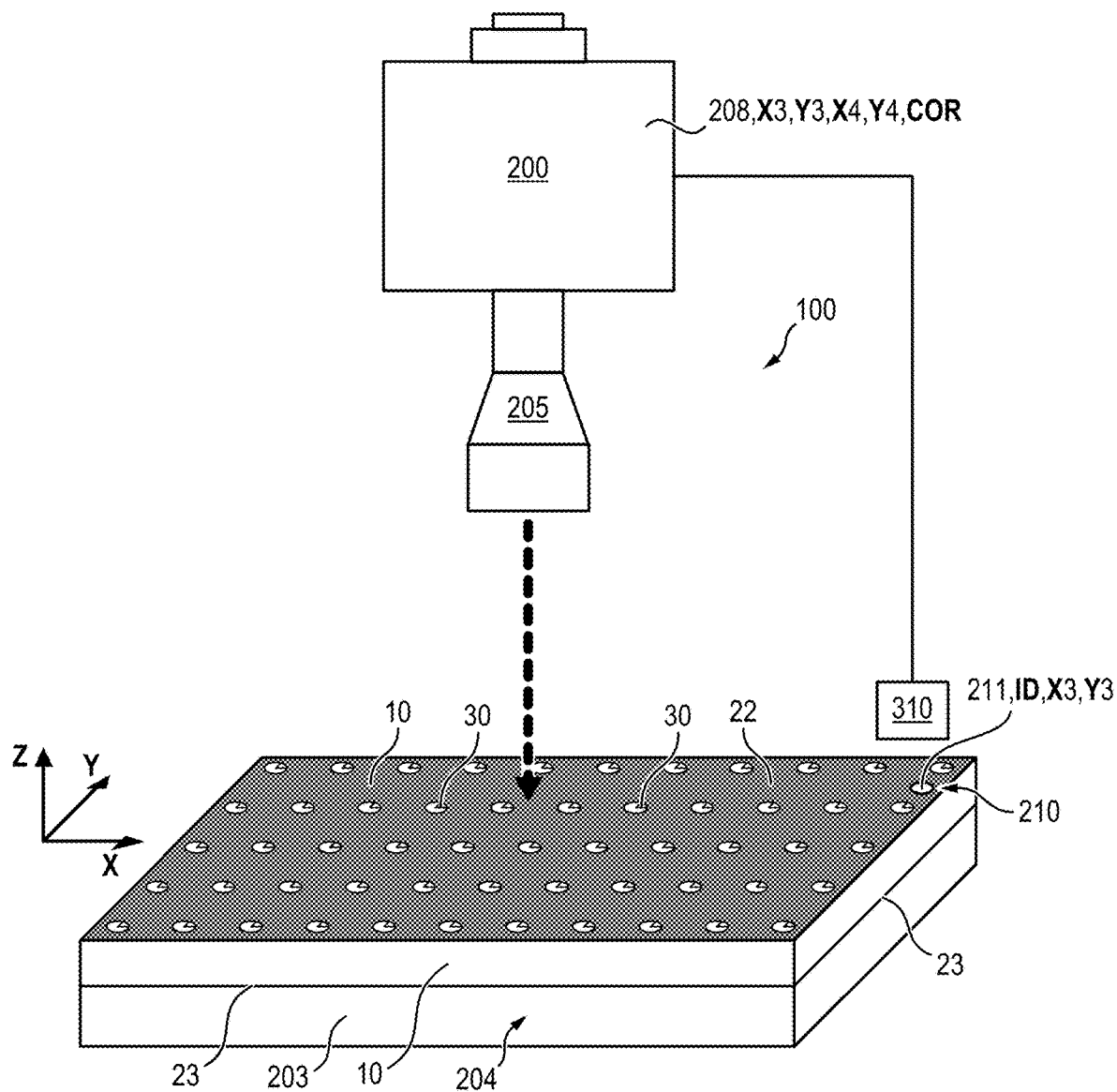
FIG. 5 is a schematic perspective view of a calibration plate according to one embodiment of the invention, positioned in an image-capture apparatus according to one embodiment of the invention.

The lower face 23 of the glass sheet 20 is distanced from the upper face 21 by a non-zero thickness E of the glass sheet 20. The lower face 23 of the glass sheet 20 is frosted. Thus, the calibration plate 10 can be illuminated from the lower face 23 so as to be able to capture an image of the upper layer 22 having the marking or markings 30 and/or 40 which are then visible by transparency in this upper layer 22, as depicted for example in FIG. 5. FIG. 5 shows a backlighting visible-light source 204 over which the lower face 23 of the calibration plate 10 can be positioned so as to be able by backlighting to capture an image of the laser-etching upper layer 22 and of the markings 30 and/or 40 using the image-capture apparatus 200 which comprises this backlighting visible-light source 204 and which is distinct and distanced from the additive manufacturing apparatus 302. This image-capture apparatus 200 will be described in greater detail hereinbelow. Thus, the calibration plate 10 according to the invention makes it possible to obtain a backlit image of the markings 30 and/or 40, which is better in quality and more precise enabling these markings to be detected by the image-capture apparatus 200 using automatic image processing.

According to one embodiment of the invention, the frosted lower face 23 of the glass sheet 20 allows backlighting visible light to pass from the lower face 23 of the glass sheet 20 through the sheet, then the reference marking or markings 30 and/or the test marking or markings 40. According to one embodiment of the invention, the frosted lower face 23 of the glass sheet 20 multiplies the directions of the reflections of the incident laser beam F encountering the lower face 23 from above once this incident laser beam F has passed through the laser-etching layer 22 and then the glass sheet 20. In the knowledge that the power of the incident laser beam F is fixed, this allows the reflected energy to be spread over a maximum number of exiting reflected beams which are characterized by different directions of reflection thereby overcoming the disadvantage of reflections of the beam. The more numerous these different directions of reflection are, the lower the amount of energy they individually contain because it is simply a matter of distribution of the incident power. Thus, upon contact with the laser-etching layer 22, the amount of energy in each individual reflected beam is low enough not to mark this laser-etching layer 22.

According to one embodiment of the invention, the laser-etching layer 22 is configured to be able to be burnt locally by the incident laser beam F in order to form the marking or markings 30 and/or 40 therein. According to one embodiment of the invention, the laser-etching layer 22 consists of or contains a layer of opaque lacquer, for example in black or dark colour, which is able to be destroyed locally by the incident laser beam F in order to form the marking or markings 30 and/or 40 therein.

According to one embodiment of the invention, during a prior step E0, the calibration plate 10 is placed on the additive manufacturing apparatus 302 and the firing system 300 of this additive manufacturing apparatus 302 performs one or more firings of one or more powerful incident laser beams F onto the top of the laser-etching layer 22 in order to create the reference marking or markings 30 therein, this being done by destroying this layer 22 at the point or points PI of impact of the powerful incident laser beam or beams F on this laser-etching layer 22. Thus, it is possible for the calibration plate 10 to comprise only the reference marking or markings 30 without test markings 40 in the laser-etching layer 22, as depicted for example in FIG. 5. This prior step E0 of creating the reference marking or markings 30 may be performed by the supplier of the calibration plate or plates 10. The end-user of an additive manufacturing apparatus 302 may thus be supplied with one or more reference plates with the reference marking or markings 30 already present on them. Thus, the reference marking or markings 30 may be integrated into the calibration plate 10 with greater precision on their positioning than in the prior art where the reference markings could be formed by reference patches added to and fixed onto the calibration plate. According to one embodiment, new reference markings 30 are created on (fired again onto) each new calibration plate and these reference markings 30 are not retained from one calibration operation to another. The reference marking or markings 30 may comprise one or more specific patterns, such as, for example, those illustrated in FIG. 6. These specific patterns of the reference marking or markings 30 make it possible to check the dimensional appearance of the reference markings 30 and ensure that the reference markings 30 are correctly identified by the image-capture apparatus 200. Working with the reference marking or markings 30 creates a transitive link between the calibrations of all of the optical systems S of the one same additive manufacturing apparatus 302. The invention allows one or more optical systems S, used for deflecting a beam F, in the one same additive manufacturing apparatus 302 to be calibrated in position simultaneously with respect to a common reference.

According to one embodiment of the invention, absolute coordinates X3, Y3 of the reference marking or markings 30, which coordinates have been determined beforehand during the prior step E0, are associated with each calibration plate 10. These absolute coordinates X3, Y3 of the reference marking or markings 30 are therefore specific to each calibration plate 10 and to each reference marking 30. This allows the end-user of the additive manufacturing apparatus 302 to be supplied with one or more reference plates with the reference marking or markings 30 already present on them, together with the absolute coordinates X3, Y3 of the reference marking or markings 30 that are specific to each calibration plate 10.

The image-capture apparatus 200 and/or a portable calibration kit 100 comprises one (or more) non-volatile memory/ies 208 in which there are recorded a unique identification ID of the calibration plate 10 and the absolute coordinates X3, Y3 of the at least one reference marking 30, which coordinates have been determined beforehand and are associated with the unique identification ID of the calibration plate 10. That makes it possible to alleviate the disadvantage of the prior art, whereby only a plate provided in the additive manufacturing apparatus must be used. The absolute coordinates X3, Y3 may be pre-recorded in a non-volatile computer memory 208 of a computer or in a non-volatile memory support readable by a computer or in any coding device, this being for example in association with the determined unique identification ID of the calibration plate 10. In instances in which several calibration plates 10 are provided, the identifications ID of the calibration plates 10 are different from one another.

Figure 9:
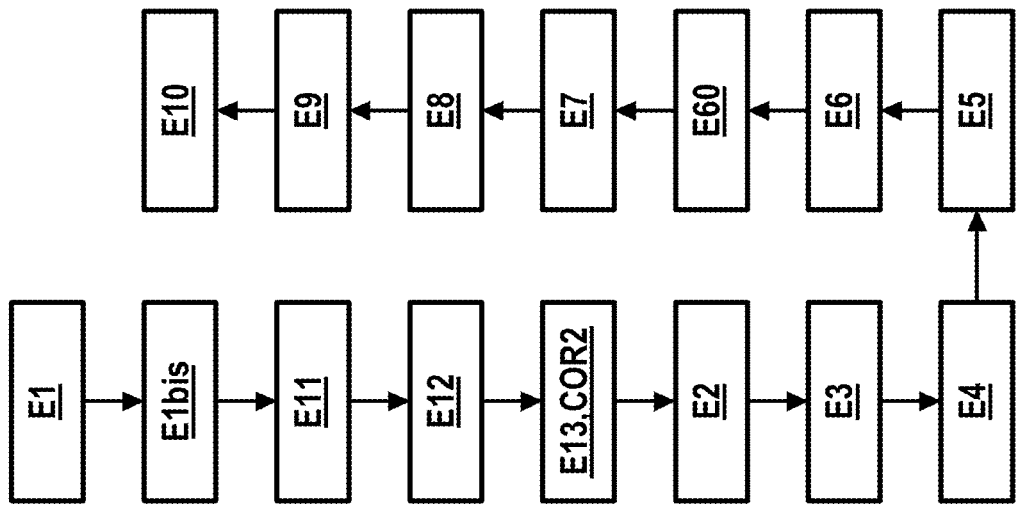
FIG. 9 depicts a flow chart of a calibration method according to one embodiment of the invention.

Provision may be made for there to be, between the steps E1 and E2 described with reference to FIG. 9, notably between the step E1 and the step E11, a step E1bis in which the unique identification ID of the calibration plate 10 and/or the absolute coordinates X3, Y3 of the at least one reference marking 30 are stored in the memory 208.

According to one embodiment of the invention, illustrated in FIGS. 1 and 5, the calibration plate 10 may comprise at least one non-volatile memory 210 in which there are recorded a unique identification ID of the calibration plate 10 and the absolute coordinates X3, Y3 of the at least one reference marking 30, which coordinates have been determined beforehand and are associated with the unique identification ID of the calibration plate 10. This memory 210 may be in the form of a chip 211 fixed to the plate 10. This chip 211 may be of the NFC and/or RFID or some other type. RFID is the abbreviation for RadioFrequency IDentification. NFC is the abbreviation for Near Field Communication. This makes it possible to manage the association between the calibration plate 10 and the file containing its measurements (X3, Y3) and avoid a complex network infrastructure that would cause external access problems. The chip 211 may be stuck to the calibration plate 10, for example to its lower face 23 or to the lateral faces that connect its upper face 21 to its lower face 23, or to its upper face 21, but some distance from the markings 30 and 40. The chip 211 may be self-adhesive. The chip 211 may allow storage capacities of up to 8 kilobytes. In that case, the calibration kit may comprise a reader 310, which may be of the RFID and/or NFC type, capable of reading the chip 211 of the memory 210 when the reader 310 and the chip 211 are brought closer to one another, so as to read the unique identification ID of the calibration plate 10 and/or the absolute coordinates X3, Y3 of the at least one reference marking 30, which data are present in the chip 211. At the start of the calibration procedure, the chip 211 of the plate 10 will be scanned by the reader 310 and the file present in the chip 211 will be automatically read, unzipped and reformatted, so that the reader 310 thus knows the positions X3, Y3 of the reference markings 30 of the plate 10. The reader 310 may form part of the image-capture apparatus 200 and/or of the calculation device 207 and/or of the sensor 205. This step E1bis of reading the unique identification ID of the calibration plate 10 and/or the absolute coordinates X3, Y3 of the at least one reference marking 30 in the NFC and/or RFID chip 211 using the NFC and/or RFID reader 310 may be provided between steps E1 and E2 described with reference to FIG. 9, notably between step E1 and step E11.

Figure 8:
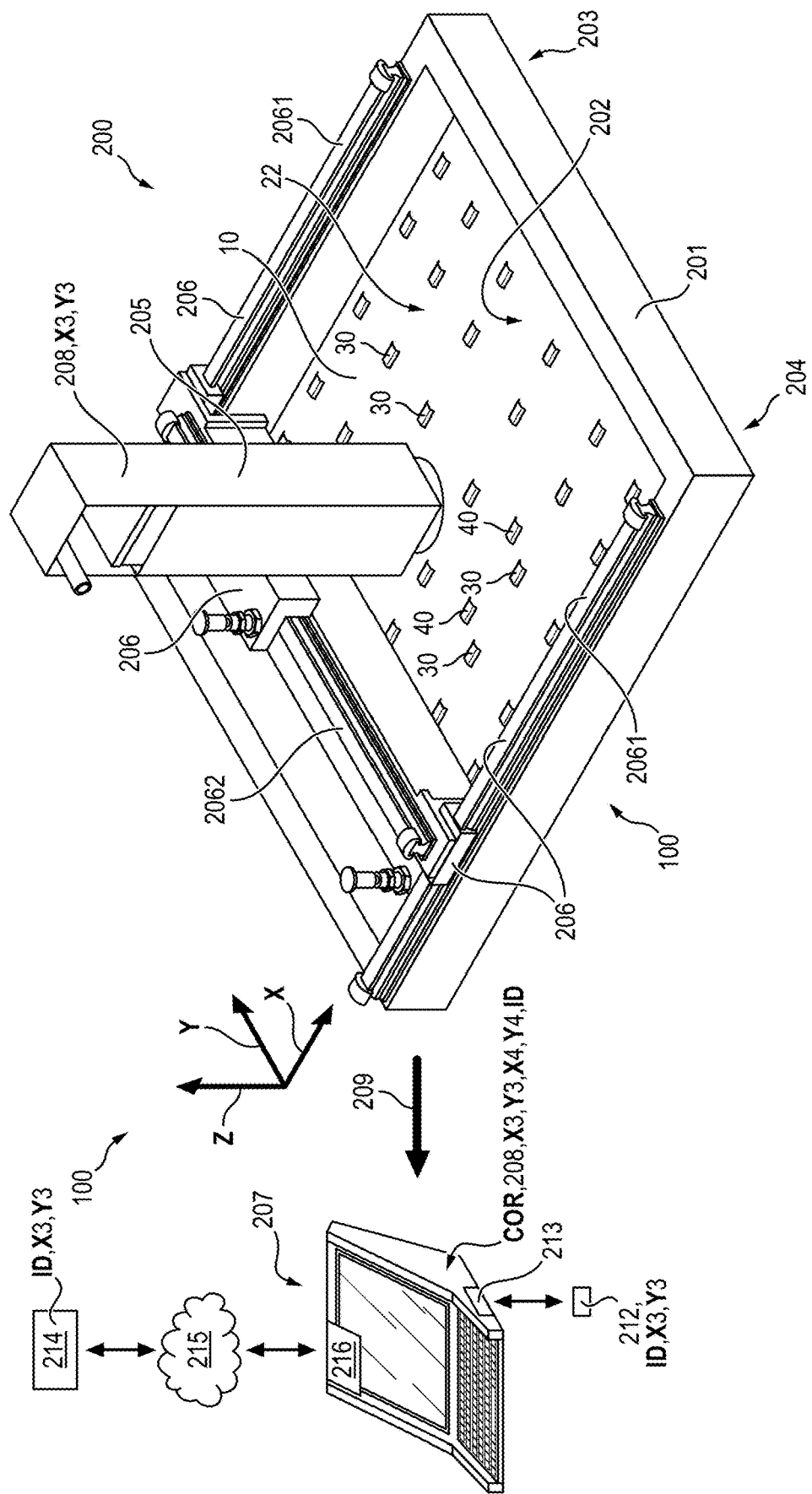
FIG. 8 depicts a schematic perspective view of an image-capture apparatus according to one embodiment of the invention.

According to one embodiment of the invention, illustrated in FIG. 8, the kit 100 further comprises a removable storage medium 212, which is distinct from the first memory 208 and on which are stored the determined unique identification ID of the calibration plate 10 and the absolute coordinates X3, Y3 of the at least one reference marking 30, which coordinates are associated with the determined unique identification ID of the calibration plate 10. The removable storage medium 212 may for example be of the USB stick or USB memory type, or of the external hard disk type. The image-capture apparatus 200 and/or the calculation device 207 comprises an interface 213 allowing the determined unique identification ID of the calibration plate 10 and/or the absolute coordinates X3, Y3 of the at least one reference marking 30, which coordinates are associated with the determined unique identification ID of the calibration plate 10, to be read from the removable storage medium 212 in order to record them in the first memory 208. The interface 213 may, for example, be a USB socket into which the removable storage medium 212 can be plugged in instances in which this medium 212 is of the USB stick or USB memory type. The interface 213 may, for example, be a disk reader in instances in which the removable storage medium 212 is of the external disk type. This step E1*bis* of reading the unique identification ID of the calibration plate 10 and/or the absolute coordinates X3, Y3 of the at least one reference marking 30 from the removable storage medium 212 via the interface 213 may be provided between the steps E1 and E2 described with reference to FIG. 9, notably between step E1 and step E11.

According to one embodiment of the invention, illustrated in FIG. 8, the image-capture apparatus 200 and/or the calculation device 207 comprises an interface 216 (a physical communications port) allowing communication via a telecommunications network 215 with a remote server 214 in which the unique identification ID of the calibration plate 10 and/or the absolute coordinates X3, Y3 of the at least one reference marking 30, which coordinates are associated with the determined unique identification ID of the calibration plate 10 are recorded. The calibration method further comprises, between the positioning E1 of the removable calibration plate 10 in the additive manufacturing apparatus 302 and the commanding E2 of the firing system 300 firing the at least one powerful incident-radiation beam F, which system belongs to the additive manufacturing apparatus 302, according to the aiming command for the aiming of the firing system 300 (and notably between step E1 and step E11), the intermediate step E1*bis* of reading the unique identification ID of the calibration plate 10 and/or the absolute coordinates X3, Y3 of the at least one reference marking 30 from the remote server 214 via the interface 216, as depicted in FIG. 9.

According to one embodiment of the invention, in the laser-etching layer 22 there are the test marking or markings 40 obtained by locally destroying the at least one laser-etching layer 22, in addition to the reference marking or markings 30. According to one embodiment of the invention, during another step E1, E2 that comes after the prior step E0, the calibration plate 10 already bearing the reference marking or markings 30 is placed on the additive manufacturing apparatus 302 and the firing system 300 of this additive manufacturing apparatus 302 performs one or more firings of one or more powerful incident laser beams F onto the top of the laser-etching layer 22 in order to create the test marking or markings 40 therein, this being done by destroying this layer 22 at the point or points PI of impact of the powerful incident laser beam or beams F on this laser-etching layer 22. The additive manufacturing apparatus 302 used for performing step E2 of creating the test marking or markings 40 may be distinct from the one that was used to perform the prior step E0 of creating the reference marking or markings 30. For example, the additive manufacturing apparatus 302 used for performing step E2 of creating the test marking or markings 40 may be that of the end-user of the calibration plate 10, whereas the additive manufacturing apparatus 302 used for performing the prior step E0 of creating the reference marking or markings 30 may be used by the supplier of the calibration plate or plates 10 who supplied this or these calibration plates 10 to this user.

According to one embodiment of the invention, in the laser-etching layer 22 there is at least one positioning sighting mark 50 of dimensions greater than the dimensions of the at least one reference marking 30 and/or than the dimensions of the at least one test marking 40. The positioning sighting mark 50 may be visible to the naked eye. The positioning sighting mark 50 may comprise several patterns, for example rectangular, situated one inside another, for example spaced from one another by the same non-zero spacing. The positioning sighting mark 50 makes it possible to measure roughly the centring offset of each sensor 205. The positioning sighting mark 50 may act as a direct naked-eye visual reference on the calibration plate 10.

According to one embodiment, the positioning sighting mark 50 is used for manually pre-positioning/pre-correcting the position of the beam F. According to one embodiment, a procedure for roughly positioning the firing system 300 of the additive manufacturing apparatus 302 on the sighting mark 50 is performed, for example as follows, this being illustrated in FIG. 9. During a step E11 (that comes after step E1 and before step E2) the firing system 300 of the additive manufacturing apparatus 302 is used to sight the sighting mark 50 with another, visible-light laser beam which is coaxial with the powerful laser beam F in the additive manufacturing apparatus 302 and which is not used for marking marks 30, 40 in the laser-etching layer 22 (this other laser beam is far lower in power than the powerful laser beam F), without emitting the powerful laser beam F and therefore without locally destroying the etching layer 22 with this other laser beam. Next, during a step E12 (that comes after step E1 and before step E2), the centring offset (in mm), on the calibration plate 10, between a first impact IMP1 of the other laser beam and its intended theoretical position at the centre C of the sighting mark 50 is identified roughly and manually with the naked eye using a graduated ruler (or any other tool for visually measuring distance using the naked eye or using the naked-eye visual distance-identifying device described hereinbelow), as illustrated by way of example in FIG. 7. The naked-eye visual distance-identifying device may be the aforementioned patterns of the positioning sighting mark 50, with the aid of which the distance between the first impact IMP1 and the centre C situated at the centre of these patterns can be measured with the naked eye by counting the number of patterns present between the centre C and the first impact IMP1. Then, during a step E13 (that comes after step E1 and before step E2), the fire command for the firing system 300 that fires the other laser beam, which system belongs to the additive manufacturing apparatus 302, is modified (an offset correction COR2 is applied to the command issued to the firing system 300 in terms of the coordinates X and Y, this correction COR2 being equal to the opposite of the centring offset, so as to correct this centring offset between the first impact IMP1 and the centre C) so that the second impact IMP2 of the other laser beam thus generated on the calibration plate 10 falls at the centre C of the sighting mark 50. The command thus modified or the offset-correction COR2 for the command is recorded in a memory of the firing system 300 or of the additive manufacturing apparatus 302 and/or in another memory of the image-capture apparatus 200 and/or in another memory of the calculation device 207 so that it can be applied to the subsequent commands issued to the firing system 300 for firing the powerful incident-radiation beam F (for example in step E2). That makes it possible to prepare the system so that the remainder of the method falls within the correct boundaries (no straddling of the test markings 40 over the reference markings 30). This makes it possible to ensure that it is possible to capture an image that simultaneously and in the one same shot contains a reference marking 30 of a calibration plate 10 and all of the associated test markings 40 for this calibration plate 10. Furthermore, according to one embodiment, an offset-correction in the direction Z normal to the directions X and Y needs to be made to the firing command issued to the firing system 300 firing the powerful incident-radiation beam F. This correction in Z may use a visual estimate of the focus following test firings by the firing system 300 that fires the powerful incident-radiation beam F. The (pre-)positioning sighting mark 50 allows a "manual" pre-correction thereby avoiding the need to position or reference the calibration plate 10 very precisely in the machine. By virtue of this positioning sighting mark 50, pre-marked plates (with the reference markings imprinted on them in advance) are more readily usable.

The removable image-capture apparatus 200 for capturing at least one image according to one embodiment of the invention is described in greater detail hereinbelow with reference to FIGS. 5 and 8. The calibration plate 10 may be placed in the image-capture apparatus 200 to create an image of the reference marking or markings 30 of the calibration plate 10 and of the test marking or markings 40 of this calibration plate 10. The image-capture apparatus 200 is configured to compare the reference marking or markings 30 of the calibration plate 10 with the test marking(s) 40 of this calibration plate 10. The image-capture apparatus 200 is autonomous, portable and separated from the firing system 300 firing the at least one powerful incident-radiation beam F, which system belongs to the additive manufacturing apparatus 200.

The image-capture apparatus 200 comprises a casing comprising a surround 201 delimiting a receiving opening 202 into which the calibration plate 10 can be inserted. The calibration plate 10 is placed into the opening 202 with the laser-etching layer 22 bearing the marking or markings 30 and/or 40 and/or the sighting mark facing upwards and with the lower face 23 facing downwards. The image-capture apparatus 200 comprises retaining members 203 for holding the calibration plate 10 in the opening 202. These retaining members 203 comprise for example a support 203 or a flat table 203 which is backlit, and on which support or table the lower face 23 of the calibration plate 10 can be positioned, as illustrated in FIG. 8.

The image-capture apparatus 200 comprises one or more sources 204 of backlighting visible light. The source or sources 204 of backlighting visible light are situated beneath the opening 202, in order to project the backlighting visible light from beneath and upwards towards the lower face 23 of the calibration plate 10 when this calibration plate 10 is positioned in the opening 202 with its lower face 23 facing downwards and towards the source or sources 204. The source or sources 204 of backlighting visible light may be in or under the backlit table 203. The image-capture apparatus 200 comprises the sensor 205 able to acquire one or more images illuminated by the backlighting visible light projected by the source or sources 204. The sensor 205 may be an optical sensor and comprise a camera, photographic equipment, or the like. The image-capture apparatus 200 comprises a guiding and supporting device 206 for positioning the sensor 205 above the opening 202 relative to the surround 201. The guiding and supporting device 206 allows the sensor 205 to be moved over the opening 202 and therefore over the laser-etching upper layer 22 of the calibration plate 10 bearing the marking or markings 30 and/or 40 and/or the sighting mark 50 when the calibration plate 10 is placed therein. The guiding and supporting device 206 allows the sensor 205 to be moved over the opening 202, for example in the two mutually perpendicular horizontal directions X and Y. The guiding and supporting device 206 may be manual or automated.

According to one embodiment of the invention, the guiding and supporting device 206 may comprise one or more first slideway rail(s) 2061 in the horizontal direction X of the abscissa axis, these being fixed to the surround 201, and one or more second rail(s) 2062 mounted for sliding in the horizontal direction X on the first rail(s) 2061. The second rail(s) 2062 extend in the direction Y of the ordinate axis. The sensor 205 is mounted to slide in the Y-direction on the second rail(s) 2062.

Thus, when the calibration plate 10 is positioned in the opening 202, the source 204 of backlighting visible light projects backlighting visible light upwards towards the opening 200 and towards the underside of the lower face 23, and then through the glass sheet 20 and then through the reference marking or markings 30 and/or the test marking or markings 40. The quality of the detection of the reference marking or markings 30 and/or of the test marking or markings 40 in the image acquired by the sensor 205 is therefore no longer dependent on the additive manufacturing apparatus 302 and can be improved using the image-capture apparatus 200.

The image-capture apparatus 200 may form part of a portable calibration kit 100, which additionally comprises one or more calibration plates 10 each having its own reference marking(s) 30. Thus, the supplier may supply the image-capture apparatus 200 together with the calibration plate(s) 10 to the end-user of the additive manufacturing apparatus 302. One advantage is then that the kit can be stored elsewhere than in the zone in which the powdered material used by the additive manufacturing apparatus 302 is held.

The image-capture apparatus 200 comprises a calculation device 207 configured to analyse the image or images acquired by the sensor 205, and to recognise the reference marking or markings 30 and the test marking or markings 40 in the image or images acquired by the sensor 205. The calculation device 207 may be or may comprise a computer, a processor, a microprocessor and automatic image-processing and shape-recognition computer programs recorded on a non-volatile support that can be read by the calculation device, such as, for example, the non-volatile memory 208. The calculation device 207 may be connected to the sensor 205 by a transmission device 209 so that the image or images acquired by the sensor 205 are sent to the calculation device 207 or copied to the calculation device 207, it being possible for the transmission device 209 to be of the wired or wireless type. The calculation device 207 is configured to calculate the aiming-command corrections COR for the firing system 300 on the basis of at least the coordinates X4, Y4 of the test marking or markings 40 with respect to the reference marking(s) 30 recognised by the calculation device 207 in the image. These corrections COR may be a first offset to be applied in the abscissa direction X and/or a second offset to be applied in the ordinate direction Y.

According to one embodiment of the invention, the portable calibration kit 100 and/or the image-capture apparatus 200 and/or the calculation device 207 and/or the sensor 205 comprises the non-volatile memory 208 and/or 210 in which the absolute coordinates X3, Y3 of the reference marking or markings 30 of each calibration plate 10 are pre-recorded, these coordinates having been determined beforehand.

According to one embodiment of the invention, the calculation device 207 is configured to calculate the aiming-command corrections COR for the aiming of the firing system 300 firing the powerful incident laser beam F, which system belongs to the additive manufacturing apparatus 302, on the basis of the coordinates X4, Y4 of the test marking or markings 40 that have been calculated for the reference marking or markings 30 and on the basis of the absolute coordinates X3, Y3 of the reference marking or markings 30.

A calibration method according to one embodiment of the invention, for calibrating the firing system 300 firing at least one powerful incident laser beam F, which system belongs to the additive manufacturing apparatus 302, using at least one removable calibration plate 10 according to the invention, bearing the reference marking or markings 30 in advance, is described hereinbelow with reference to FIG. 9. This calibration method comprises the steps described hereinbelow and may be performed by the end-user who has received the calibration plate 10 and/or the calibration kit 100 to calibrate his own additive manufacturing apparatus 302.

During a first step E1, the user positions the removable calibration plate 10 in the additive manufacturing apparatus 302. In this position, the laser-etching upper layer (or layers) 22 of the removable calibration plate 10 bearing the reference marking or markings 30 is made to face towards the side 304 from which the powerful incident laser beam (or beams) F is (are) emitted by the firing system 300, while the lower face 23 is further away from the side 304 from which the powerful incident laser beam (or beams) F is (are) emitted by the firing system 300 than is (are) the laser-etching upper layer(s) 22. This first step E1 therefore comes after the prior step E0 described above.

Figure 6:
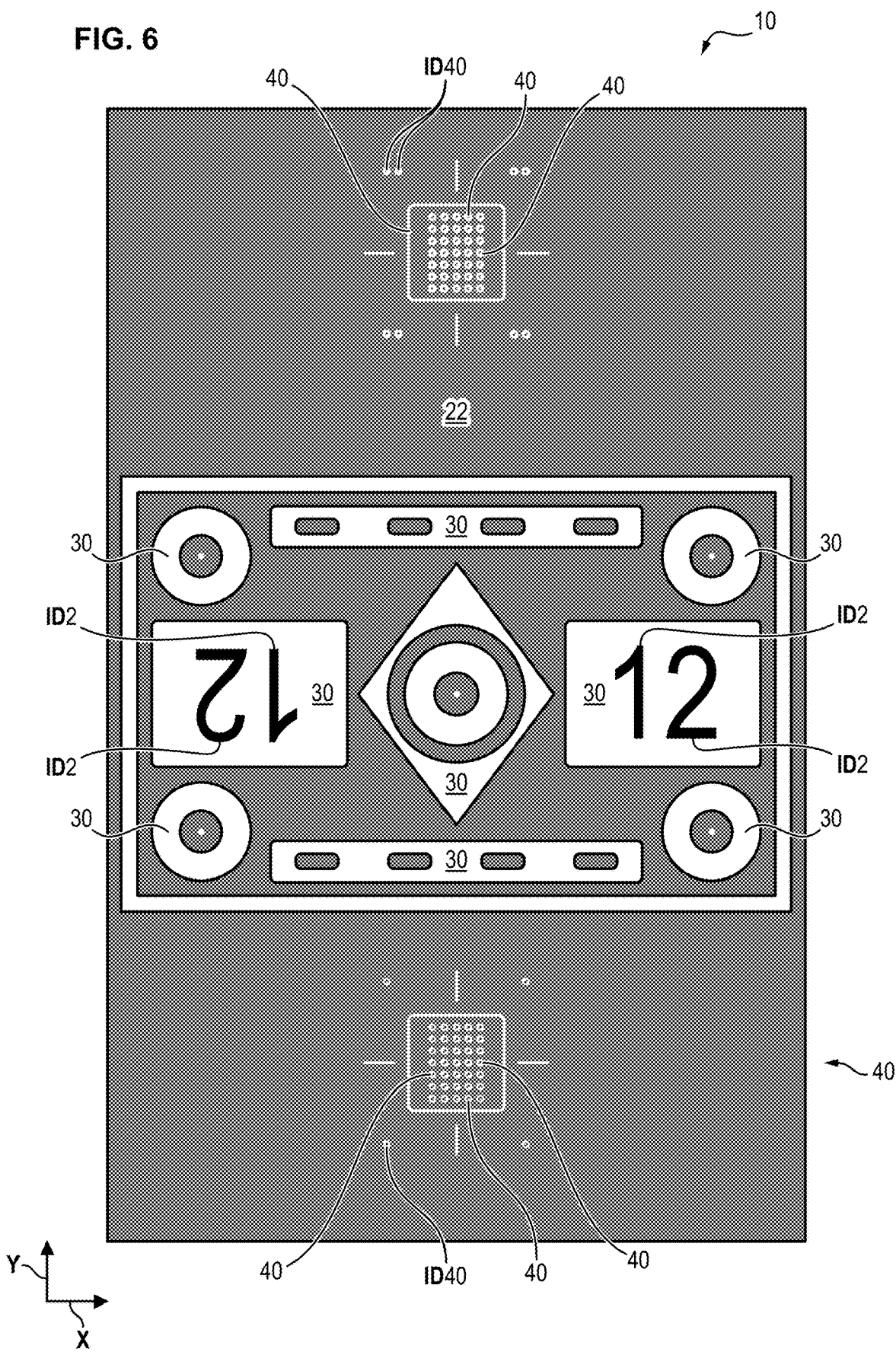
FIG. 6 depicts a schematic view from above of reference markings and of test markings that may be present on a calibration plate according to one embodiment of the invention.
Figure 7:
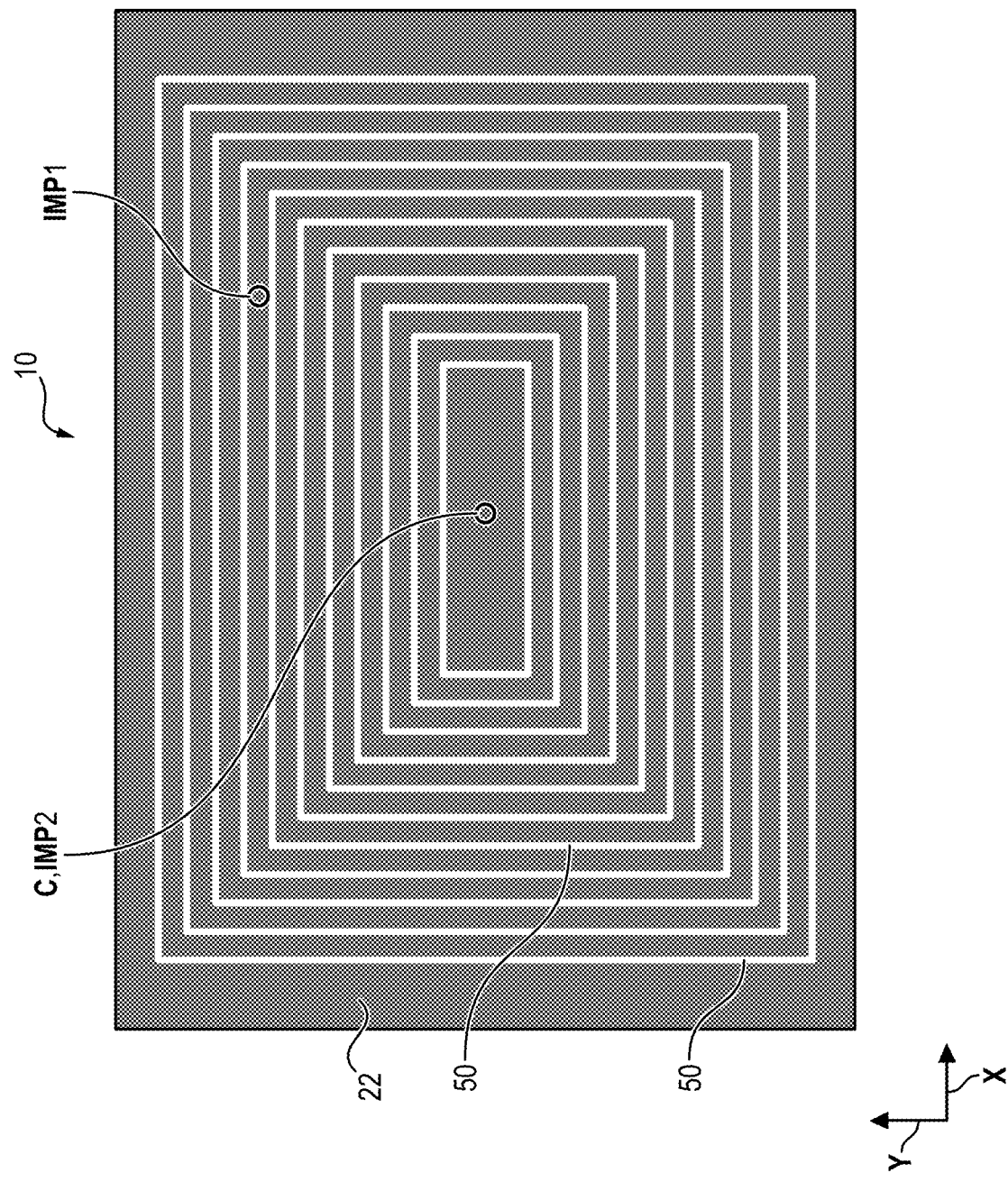
FIG. 7 depicts a schematic view from above of a positioning sighting mark that may be present on a calibration plate according to one embodiment of the invention.
Figure 10:
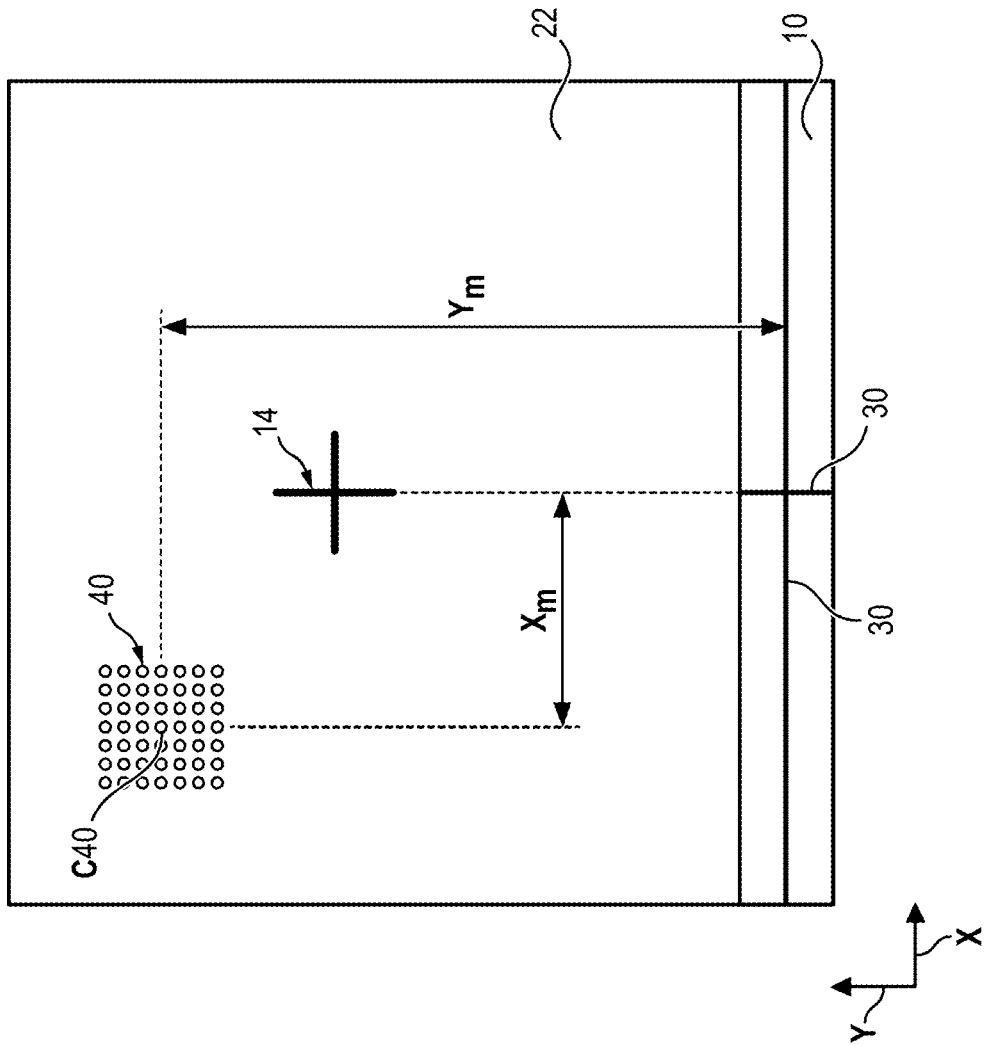
FIG. 10 depicts a schematic view from above of an image obtained by an image-capture apparatus according to one embodiment of the invention.

During a second step E2 that comes after the first step E1, the user commands the firing system 300 that fires the powerful incident laser beam(s) F, which system belongs to the additive manufacturing apparatus 302, according to an aiming command for the aiming of the firing system 300, which command is determined with respect to the reference marking(s) 30, to emit the powerful incident laser beam(s) F from the emission side 304 onto the laser-etching layer 22 of the removable calibration plate 10 in order thereon to form the test marking or markings 40 by local destruction of the laser-etching layer 22. One test marking 40 may be created for each reference marking 30. A plurality of test markings 40 situated some distance from one another may be created for a plurality of reference markings 30 situated some distance from one another. Each test marking 40 may be a pattern of dots centred on a predetermined theoretical target point 14 (indicated by a cross 14 in FIG. 10 and not present on the plate 10). The firing system 300 may be commanded to fire, for each reference marking 30, once (or more) on the given theoretical target position 14 close to the corresponding reference marking 30. The test marking 40 may be created on the plate 10 close to the given theoretical target position 14 in order to improve the identification of the firing position and therefore the precision of the calibration. As illustrated in FIG. 6, the test marking 40 may be centred on the given theoretical target position 14 and may consist of a square surrounding the given theoretical target position of the firing, it being possible for the square to be surrounded by a cross made up of horizontal and vertical strokes. The firing of the test marking 40 may be performed as a succession of several firing points distributed in a predefined firing pattern (matrix pattern 40 measuring 7×7 points in the example of FIG. 10).

During a third step E3 that comes after the second step E2, the user removes the removable calibration plate 10 from the additive manufacturing apparatus 302.

During a fourth step E4 that comes after the third step E3, the user moves the removable calibration plate 10 to the image-capture apparatus 200, which is portable and separated from the firing system 300 firing the at least one powerful incident laser beam F, which system belongs to the additive manufacturing apparatus 302.

During a fifth step E5 that comes after the fourth step E4, the user positions the removable calibration plate 10 in the opening 202 of the image-capture apparatus 200, that is distant from and not attached to the additive manufacturing apparatus 302.

During a sixth step E6 that comes after the fifth step E5, the user commands the source(s) 204 of backlighting visible light belonging to the image-capture apparatus 200 so that the backlighting visible light passes through the opening 202, from the lower face 23, the glass sheet 20, the reference marking (or markings) 30 and the test marking (or markings) 40, as described above.

During a seventh step E7 that comes after the sixth step E6, the user commands the image-capture apparatus 200 so that the sensor 205 acquires one (or more) image(s), in the backlighting visible light projected by the source 204, of a zone of the laser-etching upper layer 22 in which the reference marking (or markings) 30 and the test marking (or markings) 40 are situated.

Between the sixth step E6 and the seventh step E7 there may be performed a sub-step E60 during which the sensor 205 is moved by the guiding and supporting device 206 relative to the calibration plate 10, for example in order to aim at a determined zone in the upper layer 22 that bears both at least one reference marking 30 and at least one test marking 40.

During an eighth step E8 that comes after the seventh step E7, the calculation device 207 of the image-capture apparatus 200 analyses the image(s) acquired by the sensor 205. The calculation device 207 using automatic image processing recognises the reference marking(s) 30 and the test marking(s) 40 in the acquired image(s), and automatically calculates coordinates X4, Y4 of the test marking(s) 40 relative to the calculated coordinates of the reference marking(s) 30 recognised in the acquired image(s) and/or relative to the absolute coordinates X3, Y3 of the reference marking(s) 30 recognised in the acquired image(s).

During a ninth step E9 that comes after the eighth step E8, the calculation device 207 calculates the aiming-command corrections COR for the aiming of the firing system 300 firing the at least one powerful incident laser beam F, which system belongs to the additive manufacturing apparatus 302, on the basis of at least the coordinates X4, Y4 of the test marking(s) 40 calculated for the reference marking(s) 30. The calculation device 207 records these aiming-command corrections COR for the aiming of the firing system 300 firing the at least one powerful incident laser beam F, which system belongs to the additive manufacturing apparatus 302, in the memory 208 of the image-capture apparatus 200.

The invention thus makes it possible to calibrate one or more laser sources autonomously and with the guarantee of absolute precision that the offset between the test markings 40 and the theoretical position will be less than 35 µm, and that this will be true for any point on the manufacturing platform. The invention also serves to calibrate one or more sources of beam(s) F against the one same reference, thereby affording a multi-laser functionality for the one same workpiece. A maximum relative offset of less than 35 µm between the sources of beams F in terms of positioning is ensured, at any point on the platform.

According to one embodiment of the invention, for each reference marking 30, the acquired image of the zone around this marking is processed by the calculation device 207 in order therefrom to deduce the position C40 of the centre (centrepoint) of the test marking 40 in the orthonormal frame of reference of said reference marking 30 (position measurements $X_m$ and $Y_m$ in the example of FIG. 10) and therefore the offset of this position C40 in relation to the theoretical target position 14, so as to calculate the corrections COR, equal to this offset, to be subtracted.

According to one embodiment of the invention, the reference markings 30 simultaneously have the same orientations in the image reference and the frame of reference of the reference markings 30 of each calibration plate 10.

According to one embodiment of the invention, the calculation device 207 is configured to record the aiming-command corrections COR in the memory 208 in association with the identification ID of the removable calibration plate 10 and with the absolute coordinates X3, Y3 of the reference marking(s) 30. These aiming-command corrections COR may be in the form of a correction table.

According to one embodiment of the invention, the aiming-command corrections COR are recorded in a memory of the firing system 300 firing the at least one powerful incident-radiation beam F, which system belongs to the additive manufacturing apparatus 302, during the ninth step E9.

According to one embodiment of the invention, during a tenth step E10 that comes after the ninth step E9, the user commands the firing system 300 that fires the powerful incident laser beam(s) F, which system belongs to the additive manufacturing apparatus 302, according to an aiming command for the aiming of the firing system 300 belonging to the additive manufacturing apparatus 302 that is corrected by the aiming-command corrections COR, so that the powerful incident laser beam(s) F is (are) fired once (or more), from the emission side 304 onto the calibration plate 10 or onto another calibration plate 10 in order thereon to form one (or more) other test marking(s) 40 by locally destroying the laser-etching layer 22, or onto the working plane P (layer of powdered material) in order to perform the additive manufacturing of an object.

According to one embodiment of the invention, an individual identification ID2 of a reference marking 30 may be present on the plate 10 in this reference marking 30, as illustrated for example in FIG. 6 which shows the identification ID2 formed by the pattern that forms the number 12. Several individual identifications ID2, different from one another, may be provided for several or all of the reference markings 30. This individual identification ID2 can thus be read in the image acquired by the image-capture apparatus 200 and serve to recognise which reference marking 30 is present in the image, when the plate 10 comprises several reference markings 30. According to one embodiment of the invention, the test marking 40 etched in the etching layer 22 of the calibration plate 10 may comprise another identification ID40 identifying the test marking 40. Thus, when a plurality of test markings 40 situated some distance from one another are etched close to a plurality of reference markings 30 situated some distance from one another on the one same calibration plate 10, the other identifications ID40 of the test marking 40 are different from one another. For example, in FIG. 6, this other identification ID40 of the test marking 40 may be a plurality of dots in different numbers for the different test markings 40. For example, according to one embodiment, different test markings 40 around each reference marking 30 of the plate 10 are identified when different sources of powerful incident laser beams F, and, therefore, different powerful incident laser beams F of the firing system 300, are being calibrated using the one same calibration plate 10. According to one embodiment, these different test markings 40 around the one same reference marking 30 therefore come from different laser sources of the firing system 300, which each need to be calibrated differently. These different identifications ID40 make it possible in such instances to identify the various sources of powerful incident laser beams F.

Of course, the embodiments, features, options and examples described hereinabove can be combined with one another or can be selected independently of one another.

The invention claimed is:

1. A removable image-capture apparatus for capturing at least one image, the image-capture apparatus comprising:
   a casing comprising a surround delimiting an opening intended to receive a removable calibration plate bearing at least one reference marking and possibly at least one test marking;
   retaining members for holding the removable calibration plate in the opening;
   at least one source of backlighting visible light situated beneath the opening;
   a sensor for acquiring the at least one image, in the backlighting visible light, of the removable calibration plate;
   a guiding and supporting device for positioning the sensor above the opening relative to the surround; and
   a calculator configured to analyze the at least one image acquired by the sensor, recognize the at least one reference marking and the possible at least one test marking in the at least one image acquired by the sensor, and calculate aiming-command corrections intended for a firing system for firing at least one power incident-radiation beam, which firing system belongs to an additive manufacturing apparatus, distinct and separate from the image-capture apparatus, the image-capture apparatus and/or the calculator comprising a first memory in which there have been pre-recorded, in association with a determined unique identification of the removable calibration plate, absolute coordinates of the at least one reference marking, which absolute coordinates have been determined beforehand,
   the calculator being configured to calculate the aiming-command corrections for the aiming of the firing system for firing the at least one power incident-radiation beam, which firing system belongs to the additive manufacturing apparatus, as a function of coordinates of the at least one test marking, that were calculated for the at least one reference marking, and as a function of the absolute coordinates of the at least one reference marking.

2. A portable calibration kit comprising the image-capture apparatus for capturing at least one image according to claim 1 and at least a removable calibration plate,
   the removable calibration plate being able to be positioned in a field of a firing system for firing at least one power incident-radiation beam, which firing system belongs to an additive manufacturing apparatus,
   the removable calibration plate comprising a sheet,
   the sheet comprising an upper face intended to face toward the at least one power incident-radiation beam, the sheet bearing the at least one reference marking and being intended to receive at least one test marking, and a lower face, which is distant from the upper face in a thickness direction of the sheet, the removable calibration plate comprising at least one etching layer to be etched by the at least one power incident-radiation beam, the at least one etching layer to be etched by the at least one power incident-radiation beam being secured to the upper face of the sheet and being opaque to visible light, the at least one etching layer to be etched by the at least one power incident-radiation beam being able to be destroyed locally by the at least one power incident-radiation beam in order to optionally form the at least one test marking, the sheet being transparent to visible light, and the lower face of the sheet being depolished.

3. The removable calibration kit according to claim 2, wherein the lower face of the sheet is transparent to backlighting visible light.

4. The removable calibration kit according to claim 2, wherein the at least one reference marking is created by locally destroying the at least one etching layer using the at least one power incident-radiation beam.

5. The removable calibration kit according to claim 2, wherein, in the at least one etching layer to be etched by the at least one power incident-radiation beam, there is at least one positioning sighting mark of dimensions greater than dimensions of the at least one reference marking and/or than dimensions of the at least one test marking.

6. The removable calibration kit according to claim 2, wherein the at least one etching layer is to be etched by the at least one power beam of incident radiation being laser.

7. The removable calibration kit according to claim 2, wherein the sheet contains glass or is made of glass.

8. The removable calibration kit according to claim 2, wherein the removable calibration plate comprises the at least one test marking created by locally destroying the at least one etching layer to be etched by the at least one power incident-radiation beam.

9. The removable calibration kit according to claim 2, wherein, in the at least one etching layer to be etched by the at least one power incident-radiation beam, there are the at least one reference marking created by locally destroying the at least one etching layer to be etched by the at least one power incident-radiation beam and the at least one test marking created by locally destroying the at least one etching layer to be etched by the at least one power incident-radiation beam.

10. The removable calibration kit according to claim 8, wherein the at least one test marking present in the etching layer to be etched by the at least one power incident-radiation beam comprises an identification of the test marking.

11. The removable calibration kit according to claim 2, wherein the kit further comprises a removable storage medium, distinct from the first memory and on which are stored the determined unique identification of the removable calibration plate and the absolute coordinates of the at least one reference marking, which absolute coordinates are associated with the determined unique identification of the removable calibration plate, the image-capture apparatus and/or the calculator comprising an interface allowing the determined unique identification of the removable calibration plate and/or the absolute coordinates of the at least one reference marking, which absolute coordinates are associated with the determined unique identification of the removable calibration plate, to be recovered from the removable storage medium in order to record them in the first memory.

12. The removable calibration kit according to claim 2, wherein the removable calibration plate comprises at least one second non-volatile memory in which there are recorded the unique identification of the removable calibration plate and the absolute coordinates of the at least one reference marking, which absolute coordinates are associated with the unique identification of the removable calibration plate, the at least one second non-volatile memory of the removable calibration plate is in the form of an NFC and/or RFID chip fixed to the removable calibration plate, the image-capture apparatus and/or the calculator and/or the sensor comprises an NFC and/or RFID reader able to read from the NFC and/or RFID chip the unique identification of the removable calibration plate and/or the absolute coordinates of the at least one reference marking, in order to record them in the first memory.

13. A calibration method for calibrating a firing system for firing at least one power incident-radiation beam, which firing system belongs to an additive manufacturing apparatus, using the removable calibration kit according to claim 2, the calibration method comprising the following steps:

positioning the removable calibration plate in the additive manufacturing apparatus, the at least one etching layer to be etched by the at least one power incident-radiation beam and that belongs to the removable calibration plate being oriented toward an emission side of the additive manufacturing apparatus from which the firing system emits the at least one power incident-radiation beam;

commanding the firing system for firing the at least one power incident-radiation beam, which firing system belongs to the additive manufacturing apparatus, according to an aiming command for the aiming of the firing system, which is determined with respect to the at least one reference marking, to emit the at least one power incident-radiation beam from the emission side onto the at least one etching layer of the removable calibration plate in order thereon to form the at least one test marking by local destruction of the at least one etching layer;

extracting the removable calibration plate from the additive manufacturing apparatus;

moving the removable calibration plate to the image-capture apparatus for capturing at least one image, which apparatus is portable and separated from the firing system for firing the at least one power incident-radiation beam, which firing system belongs to the additive manufacturing apparatus;

positioning the removable calibration plate in the opening of the image-capture apparatus;

commanding the at least one source of backlighting visible light of the image-capture apparatus so that the backlighting visible light passes from the lower face through the opening, the sheet, the at least one reference marking and the at least one test marking;

acquiring, using the sensor, at least one backlighting visible light image of a zone in which there are the at least one reference marking and the at least one test marking;

analyzing, using a calculator belonging to the image-capture apparatus, the at least one backlighting visible light image acquired by the sensor and recognizing the at least one reference marking and the at least one test marking in the at least one backlighting visible light image acquired, so as to calculate coordinates of the at least one test marking with respect to the at least one reference marking; and calculating and recording, in the first memory of the image-capture apparatus, using the calculator of the image-capture apparatus, aiming-command corrections for the aiming of the firing system for firing the at least one power incident-radiation beam, which firing system belongs to the additive manufacturing apparatus, as a function of at least the coordinates of the at least one test marking, that were calculated for the at least one reference marking.

14. The calibration method according to claim 13, wherein the aiming-command corrections are recorded in the first memory in association with the identification of the removable calibration plate and with the absolute coordinates of the at least one reference marking.

15. The calibration method according to claim 13, wherein the aiming-command corrections are recorded in the firing system firing the at least one power incident-radiation beam, which firing system belongs to the additive manufacturing apparatus.

16. The calibration method according to claim 13, wherein, in the at least one etching layer to be etched by the at least one power incident-radiation beam, there is at least one positioning sighting mark having dimensions greater than the dimensions of the at least one reference marking and/or than the dimensions of the at least one test marking, and the following steps are performed between the positioning of the removable calibration plate in the additive manufacturing apparatus and the commanding of the firing system for firing the at least one power incident-radiation beam, which firing system belongs to the additive manufacturing apparatus:

commanding the at least one firing system belonging to the additive manufacturing apparatus to emit at least one other beam of visible-light radiation, without emitting a power incident-radiation beam from the emission side onto the at least one etching layer of the removable calibration plate so as to project a first impact of the at least one other beam of visible-light radiation on the at least one positioning sighting mark;

measuring, with a naked eye, on the at least one positioning sighting mark, an offset in the centering of the first impact of the at least one other beam of visible-light radiation with respect to a theoretical position that is supposed to be at a center of the at least one positioning sighting mark;

modifying the command of the at least one firing system, belonging to the additive manufacturing apparatus, with a command-offset correction so as to emit the at least one other beam of visible-light radiation, without emitting a power incident-radiation beam from the emission side onto the at least one etching layer of the removable calibration plate so as to project a second impact of the at least one other beam of visible-light radiation on the center of the at least one positioning sighting mark; and recording the command-offset correction in a memory of the firing system or of the additive manufacturing apparatus and/or in a memory of the image-capture apparatus and/or in a memory of the calculator, said commanding of the at least one firing system for firing the at least one power incident-radiation beam, which firing system belongs to the additive manufacturing apparatus, according to the aiming command for the aiming of the firing system, which is determined with respect to the at least one reference marking, to emit the at least one power incident-radiation beam from the emission side onto the at least one etching layer of the removable calibration plate in order thereon to form the at least one test marking by local destruction of the etching layer, being corrected by the command-offset correction having been recorded, the at least one power incident-radiation beam and the at least one other visible-light laser beam being coaxial.

17. The calibration method according to claim 13, wherein the kit further comprises a removable storage medium, which is distinct from the first memory and on which are stored the determined unique identification of the removable calibration plate and the absolute coordinates of the at least one reference marking, which absolute coordinates are associated with the determined unique identification of the removable calibration plate, the image-capture apparatus and/or the calculator comprising an interface allowing the determined unique identification of the removable calibration plate and/or the absolute coordinates of the at least one reference marking, which absolute coordinates are associated with the determined unique identification of the removable calibration plate, to be recovered from the removable storage medium in order to record them in the first memory, and the calibration method further comprises, between the positioning of the removable calibration plate in the additive manufacturing apparatus and the commanding of the firing system for firing the at least one power incident-radiation beam, which firing system belongs to the additive manufacturing apparatus, according to the aiming command for the aiming of the firing system, an intermediate step of reading the unique identification of the removable calibration plate and/or the absolute coordinates of the at least one reference marking from the removable storage medium.

18. The calibration method according to claim 13, wherein the removable calibration plate comprises at least one second non-volatile memory in which there are recorded the unique identification of the removable calibration plate and the absolute coordinates of the at least one reference marking, which absolute coordinates have been determined beforehand and are associated with the unique identification of the removable calibration plate, the at least one second non-volatile memory is in the form of an NFC and/or RFID chip fixed to the removable calibration plate, the image-capture apparatus and/or the calculator and/or the sensor comprises an NFC and/or RFID reader able to read from the NFC and/or RFID chip the unique identification of the removable calibration plate and/or the absolute coordinates of the at least one reference marking, and the calibration method further comprises, between the positioning of the removable calibration plate in the additive manufacturing apparatus and the commanding of the firing system for firing the at least one power incident-radiation beam, which firing system belongs to the additive manufacturing apparatus, according to the aiming command for the aiming of the firing system, an intermediate step of reading the unique identification of the removable calibration plate and/or the absolute coordinates of the at least one reference marking in the NFC and/or RFID chip using the NFC and/or RFID reader.

19. The calibration method according to claim 13, further comprising, between the positioning of the removable calibration plate in the additive manufacturing apparatus and the commanding of the firing system for firing the at least one power incident-radiation beam, which firing system belongs to the additive manufacturing apparatus, according to the aiming command for the aiming of the firing system, an intermediate step of reading the unique identification of the removable calibration plate and/or the absolute coordinates of the at least one reference marking from a file stored in a database hosted on a remote server to which the calculator has access.

\* \* \* \* \*